FLUID-COOLED ELECTRICAL MODULE ASSEMBLY

Filed Jan. 13, 1959 2 Sheets-Sheet 1

INVENTORS
KENNETH EMERSON WOODWARD
ROBERT BUTTERWORTH
BY S. J. Rotondi, A. J. Dupont
J. E. McGee & N. Cass

FLUID-COOLED ELECTRICAL MODULE ASSEMBLY

Filed Jan. 13, 1959

2 Sheets-Sheet 2

INVENTORS
KENNETH EMERSON WOODWARD
ROBERT BUTTERWORTH

BY S. J. Rotondi, A. J. Dupont,
F. E. McGee & N. Caso

United States Patent Office 2,942,856
Patented June 28, 1960

2,942,856

FLUID-COOLED ELECTRICAL MODULE ASSEMBLY

Kenneth E. Woodward, McLean, Va., and Robert Butterworth, District Heights, Md., assignors to the United States of America as represented by the Secretary of the Army Filed Jan. 13, 1959, Ser. No. 786,664

3 Claims. (Cl. 257—250)

(Granted under Title 35, U.S. Code (1952), sec. 266)

The invention described herein may be manufactured and used by or for the Government for governmental purposes without the payment to us of any royalty thereon.

This invention relates generally to the mounting and construction of electrical equipment and more particularly to a rigid modularized construction having improved fluid-cooling means.

In prior art systems, cooling of modularized equipment was complicated by the need to mount the modules rigidly and compactly. Typical previous equipment, if assembled in modules, offer neither cooling nor an assembly capable of withstanding high accelerations.

Accordingly, it is an object of this invention to provide a modularized electrical construction capable of assembly into a rigid and compact unit.

It is a further object to provide such a modularized construction having improved cooling means whereby the heat generated by electrical circuit components is rapidly and efficiently removed.

The specific nature of the invention, as well as other objects, uses and advantages thereof, will clearly appear from the following description and from the accompanying drawing, in which.

Previous modularized electronic equipment, such as radar equipment for airborne use, employ a centralized frame into which modules are plugged with some type of retaining means, such as long screws. This equipment is then packaged with dust covers and shock-mounted in the aircraft. For completely enclosed equipment and in equipment subject to considerable acceleration and vibration, this construction will neither provide the necessary cooling nor be capable of withstanding the severe shock and vibration forces present. On the other hand, the construction now to be described in accordance with the present invention provides an assembly which is not only rigid and compact, but also is efficiently cooled and is capable of withstanding severe vibrations and accelerations.

Figures 1, 2:
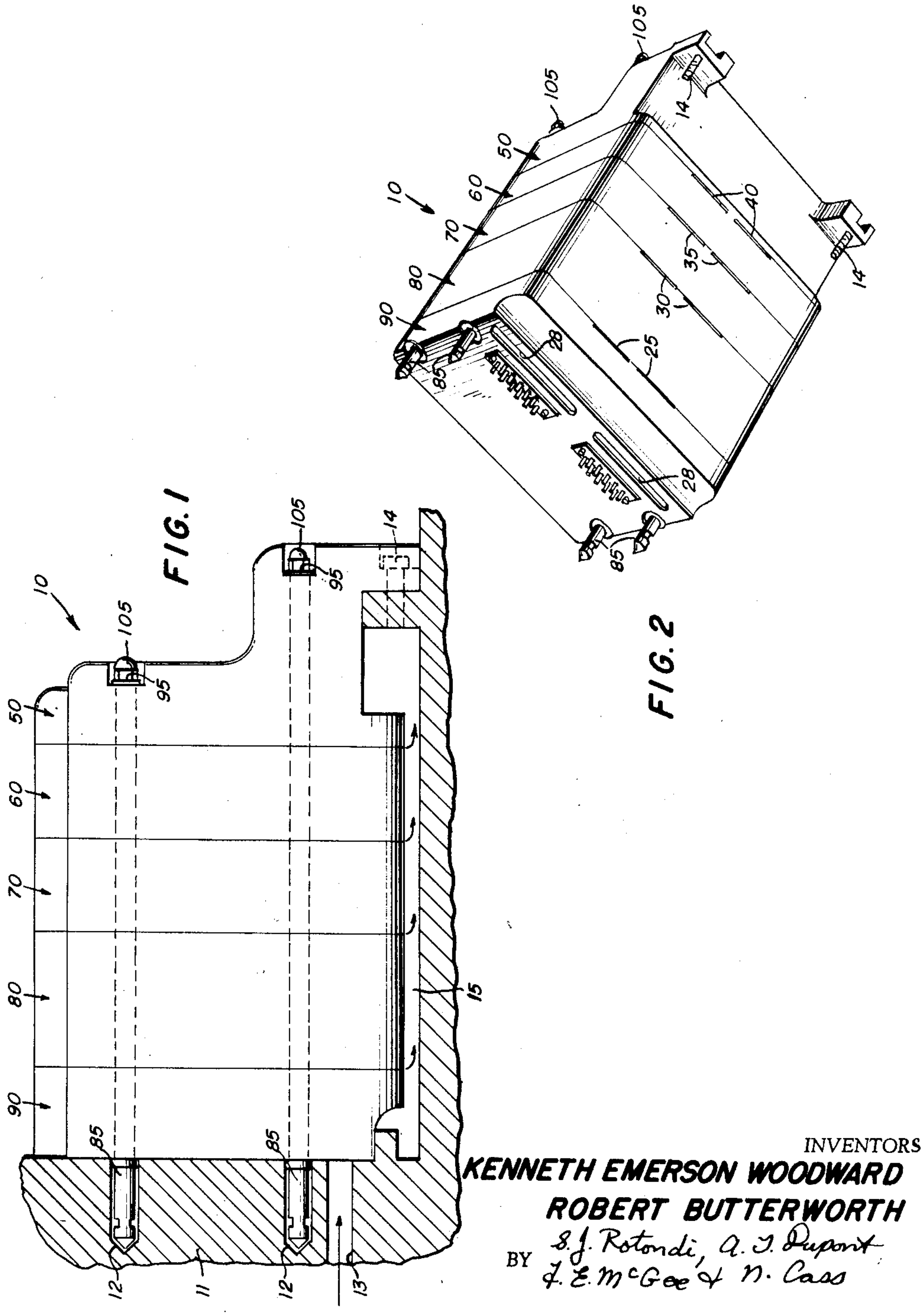
Fig. 1 shows a mounted assembly in accordance with the invention.
Fig. 2 is a perspective view of the assembly, particularly illustrating the cooling fluid intake and exhaust means.

Fig. 1 illustrates a modularized electrical device in accordance with the invention, such as an electronic receiver 10 mounted on a suitable base 11. This base 11 is part of the structure of the vehicle carrying the equipment. Recesses 12 accept locating and weight-bearing pins 85 of the receiver 10. A duct 13 is arranged to provide cooling air or some other cooling fluid to the receiver 10. The receiver 10 is fastened to the base 11 by a screw 14 as shown. This mounting is highly rigid, to minimize possible motion or vibration of receiver 10 in relation to base 11.

In Fig. 2, receiver 10 is shown upside down with respect to the positioning shown in Fig. 1. Intake ducts 28 opposite the air duct 13 (Fig. 1) serve as inputs for the application of the cooling fluid to the receiver 10, while the parallel slits 25, 30, 35 and 40 serve as exhaust means for the cooling fluid from the receiver 10. The slits 25, 30, 35 and 40 are made progressively wider as their distance from the intake ducts 28 increases in order to take into account the fall in pressure of the cooling fluid as it propagates through the receiver 10. This permits approximately equal amounts of the cooling fluid to be expelled from each pair of slits into the passageway 15. Those skilled in the art will readily understand how to adjust the widths of the slits accordingly. The operation of the slits 25, 30, 35 and 40, will be further explained later on in the description.

Figure 3:
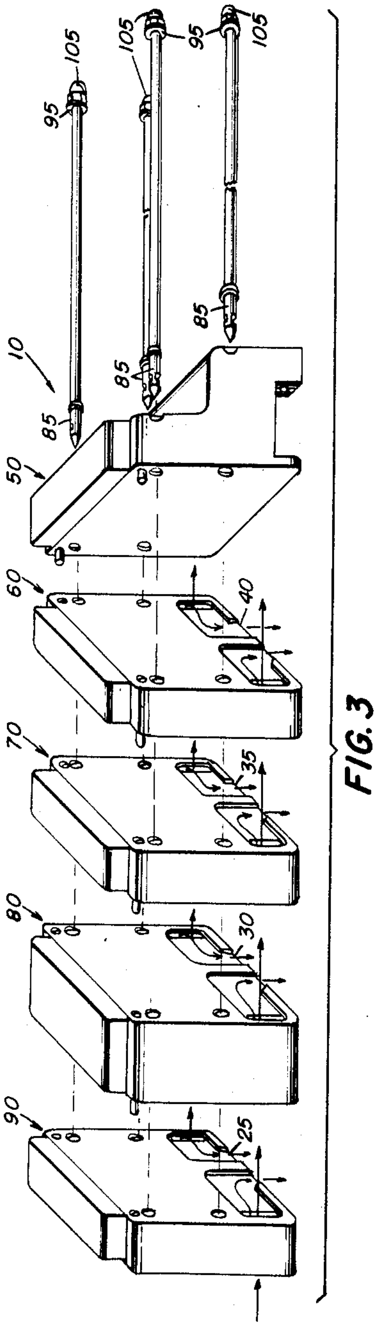
Fig. 3 is an exploded view of the assembly illustrating the individual modules, and the path of flow of the cooling fluid therebetween.

In Fig. 3, the receiver 10 is disassembled to show the relation of the modules and the flow of the cooling fluid therebetween. It can be seen that the receiver 10 is made up of five modules 50, 60, 70, 80 and 90 adapted to be clamped together by means of pins 85, lock washers 95, and nuts 105. The dashed lines indicate the flow of cooling fluid through the modules.

Figure 4:
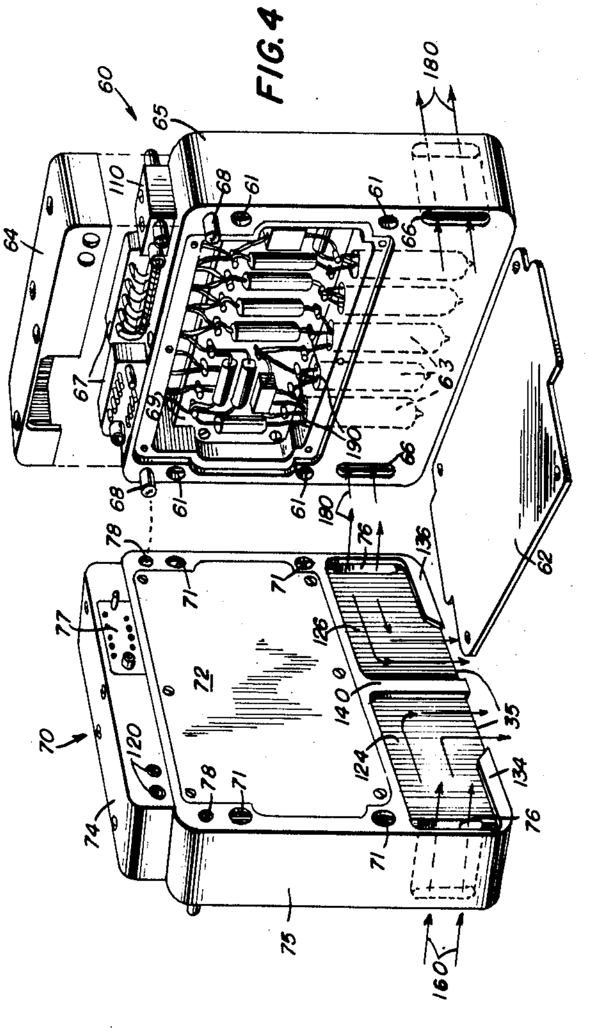
Fig. 4 is a perspective view illustrating the cooling fluid flow and the arrangement of the electronic components in a typical set of adjacent modules.

To clearly illustrate the construction of the modules and the action of the cooling fluid, the two adjacent modules 60 and 70 illustrated in Fig. 4 will now be considered. The module 60 is shown with its cover plate 62 off to illustrate a typical arrangement of electrical components. The top cover 64 of module 60 has also been removed to illustrate the electrical connection means provided between modules. A typical module such as 60 comprises a partially hollow rectangular frame 65 having electrical components and tubes shock-mounted therein, by well-known means. The lower portion of the frame 65 has bores 190 in which are mounted tubes 63. As one type of shock mounting, the tubes 63 may be wrapped in a sponge or plastic material and force-fitted into the bores 190. The upper portion of the frame 65 is substantially hollow and is sealed by plates 62 on opposite sides, one of which is shown off the module 60. The module 60, as do the other modules, has male and female electrical circuit plugs 67 mounted on the top of the frame 65 to permit electrical connection between the circuits in adjacent modules. The plug 110 of module 60 and its mating counterpart 120 of module 70, are provided to permit a coaxial line connection between high frequency circuits. Holes 61 in module 60 and 71 in module 70 are provided to permit pins 85 (Fig. 3) to pass therethrough when the modules are stacked. The module 60 has guide pins 68 which mate with openings 78 in module 70 to align the modules during stacking, and also, to reduce shock and vibration effects.

Elongated openings 66 and 76 in modules 60 and 70, respectively, are provided to permit the cooling fluid to pass from module to module. One face of each module, as shown by module 70 in Fig. 4, has a pair of recessed faces 124 and 126 at the lower portion of the rectangular frame 75. Each recessed face extends to the lower edge so as to form the slits 35. Shoulders 134 and 136 extend along a portion of the lower edge of one side of the rectangular frame 75, and shoulder 140 divides the two recessed faces 124 and 126. The opposite side of the module 70 is the same as the side of module 60 shown in Fig. 4 and has no recessed portions. Likewise, the other side of module 60 has recessed portions similar to those shown in module 70. When modules 60 and 70 are stacked together, the recessed portions 124 and 126 each form a substantially fluid-tight face-to-face space which communicates with elongated openings 66 and 76, and a slit 35. The cooling fluid enters the module 70 as shown at 180 in Fig. 4 passing through the elongated openings 76. A portion of the cooling fluid from each elongated opening 76 flows through its respective face-to-face space and is exhausted through its respective slit 35. The path of fluid flow is indicated by the dashed lines in Fig. 4. The remainder of the air passes on to the elongated holes 66 in module 60 as shown at 180. The portion of the cooling fluid which is heated is thus expelled at the slits while the unheated portion passes on to cool the modules following.

The heat generating electric components within each module, such as tubes 63 in module 60, are located in the lower portion of the frame 65 as shown in Fig. 4. The upper portion of each module is made to incorporate the components, such as capacitors and resistors, which normally do not generate sufficient heat to cause a problem as to its removal. By such as arrangement, it will be understood that the heat generating components in the lower part of the frame of each module transfer heat to the faces over which the cooling fluid flows, thereby providing rapid and efficient cooling.

The flow of the cooling fluid through the receiver 10 can be readily seen from the drawing, particularly the dashed flow lines in Figs. 3 and 4. The cooling fluid from the duct 13 in Fig. 1 enters the intake ducts 28 (Fig. 2) and is propagated through the module stack by means of elongated holes in the respective modules (Fig. 3), a portion of the cooling fluid being bled off between each pair of modules to provide cooling as explained in connection with Fig. 4. It will be understood that the pressure of the cooling fluid entering at the intake ducts 28 is so chosen in relation to the widths of the exhaust slits and the number of modules as to provide the desired degree of cooling.

Although only a specific type of modularized electronic equipment has been described, it is to be understood that this invention also includes within its scope various other possible constructions. For example, the recessed portion of each module over which the cooling fluid flows can readily be extended to cool the entire module face, if this were desired. Also, instead of exhausting the heated cooling fluid at each slit, the entire cooling fluid could be caused to pass through the unit and be exhausted at the end opposite the intake end. Although this arrangement permits recycling, it is considerably less desirable since the unit will then have a temperature gradient as the cooling fluid becomes progressively hotter in propagating through the unit.

It can be seen, therefore, that any modular electrical device can readily be provided with cooling means in accordance with the present invention. It is further to be noted that the stacking means provided by the present invention, incorporating the improved cooling means as described, also provides the rigidity, compactness and resistance to shock and vibration which are essential in many types of military applications. In addition, the electronic components are sealed from the cooling fluid so as not to be contaminated thereby.

It will be apparent that the embodiment shown is only exemplary and that various modifications can be made in construction and arrangement within the scope of the invention as defined in the appended claims.

We claim as our invention:

1. A modularized electrical device comprising a plurality of clamped stacked modules, one end of said device having an opening adapted to receive a cooling fluid, electrical components mounted in said modules which generate heat, a first recessed portion in at least one face of a first pair of adjacent modules forming a first face-to-face space therebetween, a second recessed portion in at least one face of a second pair of adjacent modules forming a second face-to-face space therebetween, said device having a first slit communicating with said first face-to-face space and a second slit communicating with said second face-to-face space, and duct means in said modules communicating with said face-to-face spaces and said intake opening such that the cooling fluid enters said intake opening and first flows to said first face-to-face space, a portion of the cooling fluid flowing through said first face-to-face space and being exhausted through said first slit, and the remaining portion of the cooling fluid passing on to said second face-to-face space and after flowing through said second face-to-face space being exhausted through said second slit, said device thereby being cooled.

2. A modularized electrical device comprising a plurality of clamped stacked modules, one end of said device having an intake opening in its lower portion adapted to receive a cooling fluid, electrical components mounted in said modules which generate heat, the major heat-producing components being mounted in the lower portions of said modules, a first recessed face in the lower portion of at least one face of one pair of adjacent modules forming a first substantially fluid-tight face-to-face space therebetween, a second recessed face in the lower portion of at least one face of another pair of adjacent modules forming a second substantially fluid-tight face-to-face space therebetween, said first and second recessed faces extending to their respective lower edges to form first and second slits in said device communicating with said first and second face-to-face spaces respectively, and duct openings passing through each of the modules of said device such that the cooling fluid enters said intake opening and first flows to said first face-to-face space, a portion of the cooling fluid flowing through said first face-to-face space and being exhausted through said first slit, and the remaining portion of the cooling fluid passing on to said second face-to-face space and after flowing through said second face-to-face space being exhausted through said second slit, the pressure at which the cooling fluid enters said intake opening being adjusted in cooperation with the widths of the exhaust slits and the number of modules to provide the desired degree of cooling.

3. A modularized electrical device comprising a plurality of clamped stacked modules, one end of said device having first and second intake openings on opposite sides in its lower portion adapted to receive a cooling fluid, electrical components mounted in said modules which generate heat, the major heat-producing components being mounted in the lower portions of said modules, a first pair of symmetrical non-contiguous recessed faces on opposite sides in the lower portion of at least one face of a first pair of adjacent modules forming a first pair of substantially fluid-tight face-to-face spaces therebetween, a second pair of symmetrical non-contiguous recessed faces on opposite sides in the lower portion of at least one face of a second pair of adjacent modules forming a second pair of substantially fluid tight face-to-face spaces therebetween, each of the recessed faces of said first pair extending to its respective lower edge to form a first pair of colinear slits communicating with said first pair of face-to-face spaces, and each of the recessed faces of said second pair extending to its respective lower edge to form a second pair of colinear slits communicating with said second pair of face-to-face spaces, first duct openings passing through one side of the lower portion of each module of said device and second duct openings passing through the other side of the lower portion of each module of said device, said duct openings communicating with the face-to-face spaces and the intake openings on their respective sides, said duct openings being so constructed and arranged in cooperation with said intake openings that the cooling fluid enters into each of said intake openings dividing into a path on each side, the cooling fluid in each path first flowing to its respective face-to-face space of said first pair, a portion of the cooling fluid in each path flowing through its respective face-to-face space of said first pair and being exhausted through its respective slit, and the remaining portion of the cooling fluid in each of the paths passing on to its respective face-to-face space of said second pair and after flowing through its respective face-to-face space being exhausted through its respective slit, the pressure at which the cooling fluid enters said intake openings being adjusted in cooperation with the widths of the exhaust slits and the number of modules to provide the desired degree of cooling.

References Cited in the file of this patent

UNITED STATES PATENTS

| | | |
|---|---|---|
| 2,815,472 | Jackson et al. | Dec. 3, 1957 |
| 2,843,806 | O'Neill | July 15, 1958 |